United States Patent [19]

Nakazato et al.

[11] 3,808,546

[45] Apr. 30, 1974

[54] DISTRIBUTED AMPLIFIER TUBE

[75] Inventors: Katsuo Nakazato; Haruo Maeda, both of Tokyo, Japan

[73] Assignee: Matsushita Electric Industrial Co., Ltd., Osaka, Japan

[22] Filed: Nov. 18, 1968

[21] Appl. No.: 776,560

[30] Foreign Application Priority Data

Nov. 25, 1967 Japan .............................. 42-76283

[52] U.S. Cl. ..................... 330/54, 313/217, 313/220

[51] Int. Cl. .............................................. H03f 3/60

[58] Field of Search ............ 330/54; 315/42, 51-54; 313/217 C, 220 C

[56] References Cited

UNITED STATES PATENTS

| | | | |
|---|---|---|---|
| 3,247,420 | 4/1966 | Mayer | 315/42 |
| 2,785,338 | 3/1957 | Goddard | 315/42 X |
| 2,273,163 | 2/1942 | Wilson | 333/70 |
| 2,942,201 | 6/1960 | Socio | 330/54 |
| 3,222,611 | 12/1965 | Norton, Jr. | 330/54 |

*Primary Examiner*—Nathan Kaufman

*Attorney, Agent, or Firm*—Stevens, Davis, Miller & Mosher

[57] ABSTRACT

A distributed amplifier tube comprising a plurality of pentode units (that is, electrode assemblies for pentodes) enclosed within an integral vacuum envelope along with transmission lines and arranged so as to constitute a distributed amplifier of minimum parastic inductance and capacitance as well as of minimum coupling between the input and output transmission lines.

3 Claims, 5 Drawing Figures

INVENTORS
KATSUO NAKAZATO
HARUO MAEDA
BY Stevens, Davis, Miller & Mosher
ATTORNEYS INVENTORS
KATSUO NAKAZATO
HARUO MAEDA
BY Stevens, Davis, Miller & Mosher
ATTORNEYS

DISTRIBUTED AMPLIFIER TUBE

This invention relates to a distributed amplifier tube, that is, a vacuum tube containing a plurality of electrode assemblies for pentodes arranged so as to constitute a distributed amplifier.

In order to obtain a wide band amplifier using pentodes, that is, electron tubes having five electrodes, it is an effective approach to constitute a distributed amplifier with them. However, the operating frequency band of such a distributed amplifier is unavoidably limited mainly owing to the structural attribute of the electron tubes.

An object of this invention is to overcome the above limitation and to provide an amplifying tube having a wide frequency band.

Other objects and features of this invention will be clarified in the following description made with reference to the accompanying drawings, in which.

Figure 1:
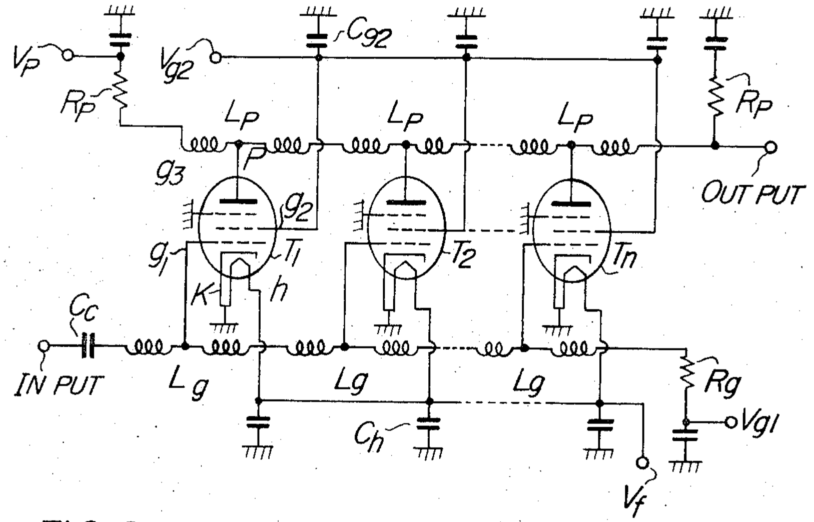
FIG. 1 is a connection diagram of a conventional distributed amplifier.

Referring to FIG. 1 which shows the electric connections in a conventional distributed amplifier, markings $T_1$, $T_2$ . . . $T_n$, indicate pentodes respectively, $L_p$ an anode transmission line connecting the respective anodes P of the pentodes sequentially, $C_{g2}$ capacitors for grounding the AC component of the voltage applied to the screen grids *g2* of the pentodes, $R_p$ anode resistors, $L_g$ a grid transmission line connecting the respective control grids *g1* of the tube, $C_c$ a coupling capacitor, $C_h$ capacitors for grounding the AC component of the heater voltage, $R_g$ a grid resistor, K cathodes of the respective tubes, *g3* suppressor grids, $V_p$ a terminal to be connected to an anode power source, $V_{g2}$ a terminal to a screen grid voltage source, $V_{g1}$ a terminal to a control grid bias voltage source, and $V_f$ indicates a terminal to a power source for energizing heaters *h* of the pentodes.

In a distributed amplifier composed as described above, however, leads, including inner lead portion, to the electrodes of the respective pentodes betray significant inductance in the high frequency range, thus limiting the operating band of the amplifier. Further, electrical coupling between the above-mentioned leads disposed closely to one another, coupling between input and output transmission lines caused by the limitations in the disposition of the external circuit components, or other inter-electrode couplings fatally affect the performance of the wide band amplifier.

According to this invention, the essential components of a distributed amplifier are put in an integral envelope and disposed so as to present performance outstandingly superior to the conventional ones.

Figure 3:
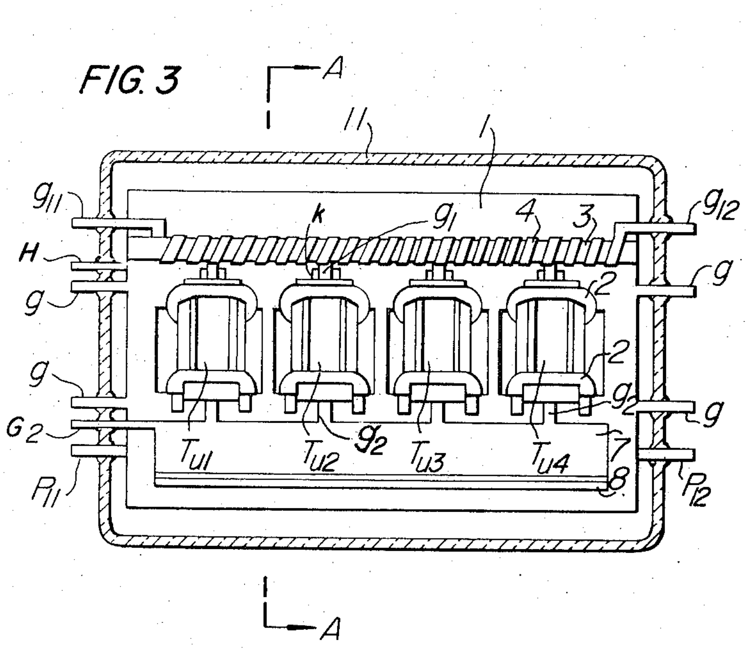
FIG. 3 is a sectioned view showing the structure of the distributed amplifier tube of FIG. 2.
Figure 4:
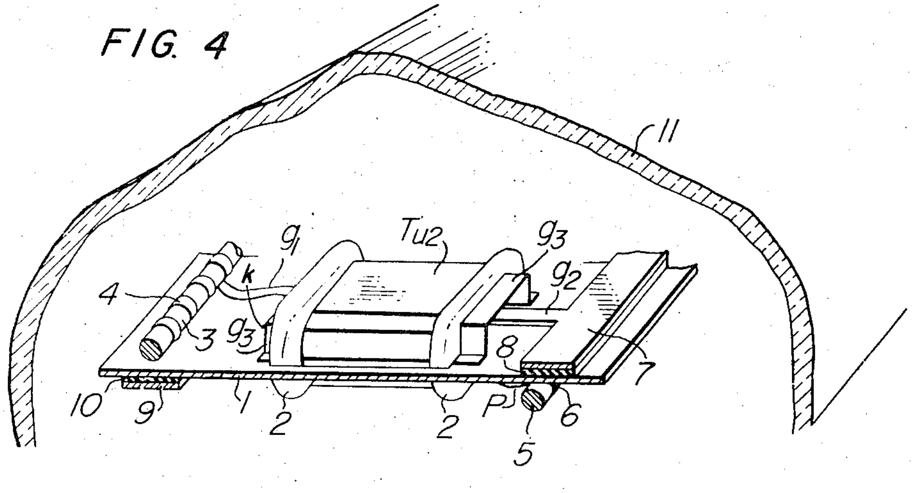
FIG. 4 is an isometric view of an essential portion of the amplifier tube shown in FIG. 3.

Referring to FIG. 3 which shows an embodiment of this invention containing four pentode units (that is, electrode assemblies of pentodes) in a single envelope, markings $T_{u1}$, $T_{u2}$, $T_{u3}$ and $T_{u4}$ indicate the pentode units secured to a base plate 1 by means of the respective suppressor grids *g3* as shown in detail in FIG. 4. The other electrodes are held at the respective proper positions by electrode supporting insulators 2. That is, as seen from FIG. 4, the suppressor grid *g3* plays an important role for supporting constituent components of the pentode unit to which it belongs.

Figure 5:
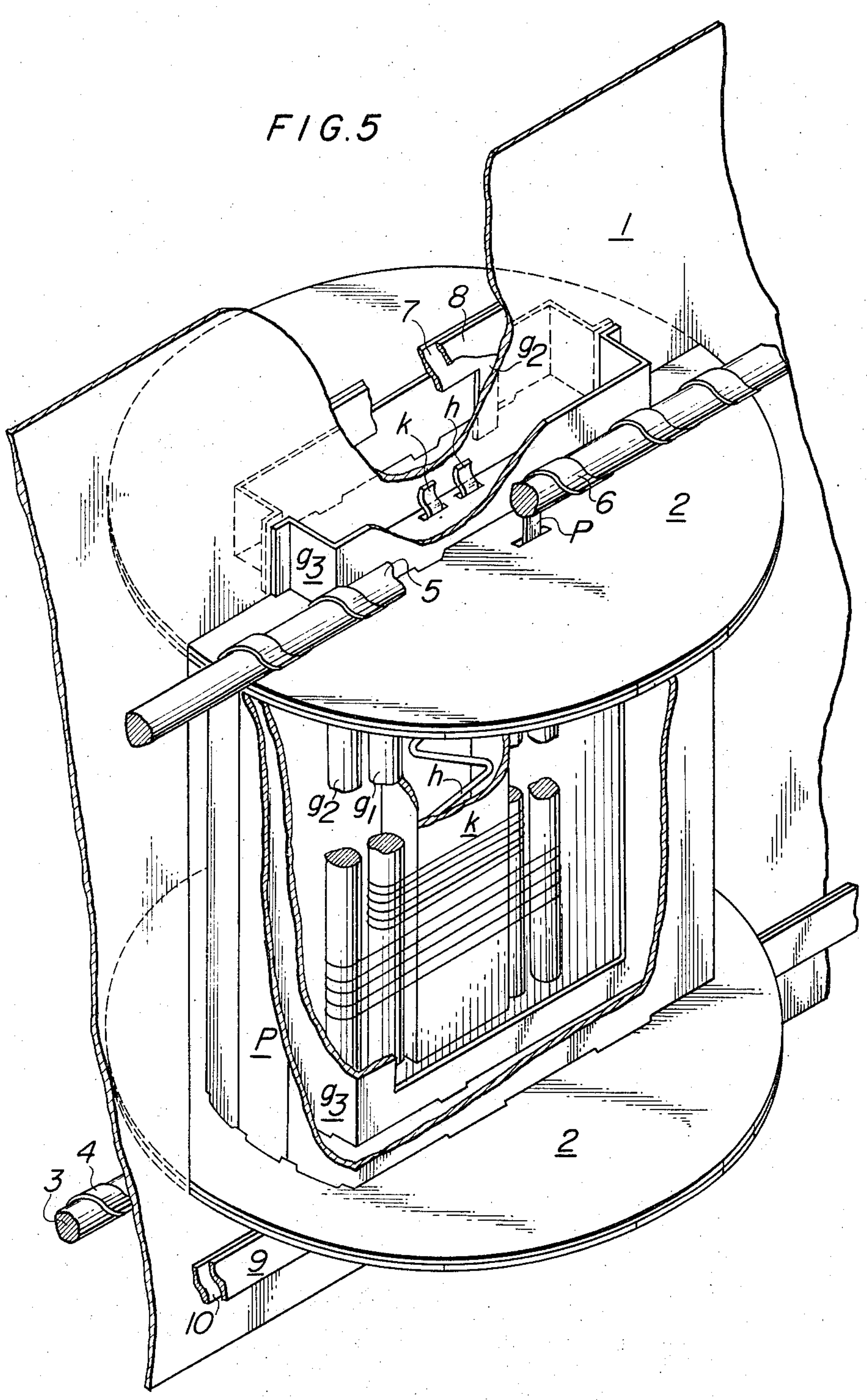
FIG. 5 is a detailed cutaway view showing the construction of a single pentode unit.

FIG. 5 shows in detail the individual electrodes of a pentode unit and their support by supporting insulator 2. In this figure, *h* indicates the heater, *k* indicates the cathode, *gl*, *g2* and *g3* indicate the control, screen and suppressor grids, respectively, P indicates the anode. As seen in FIG. 5, the terminal of the anode P is connected to a coil-shaped conductor 6 wound on an insulator 5 which constitutes an anode transmission line, that is, an output transmission line, through an aperture provided in the upper supporting insulator 2, while the control grid is connected in the same manner through the lower supporting insulator 2 to a coil-shaped conductor 4 which is wound on a rod-shaped insulator 3 and which constitutes a grid transmission line, that is, an input transmission line. The grid transmission line and the anode transmission line are disposed on the mutually opposite surfaces of the base plate 1 as shown in FIGS. 5 and 4. The screen grid *g2* is connected through an aperture provided in the supporting insulator 2 to a plate conductor 7 which is placed on the base plate 1 with an insulating plate 8 interposed between them, thereby constituting the screen grid bypass capacitor C*g2*. One end of each heater *h* is connected through another aperture provided in the supporting insulator 2 to another plate conductor 9 which is placed on the other side of the base plate 1 with an insulating plate 10 interposed between them, thereby to constitute the heater bypass capacitor C*h*. The other end of heater *h* is connected to the base plate 1 which is grounded, through another aperture provided in the supporting insulator 2. The cathode *k* is also connected to the base plate 1 as shown in FIG. 5. Respective electrodes are supported by being inserted and fitted in respective slots or apertures which are shaped suitably for the shapes of the respective electrodes and provided at predetermined positions as best illustrated by the relative positions of the anode P and the suppressor grid in FIG. 5.

Markings $P_{11}$ and $P_{12}$ in FIG. 3 indicate respectively the matching input and output terminals of the anode transmission line, g11 and g12 respectively the matching input and output terminals of the grid transmission line, H the heater terminal connected to the plate conductor 9, G2 the screen grid terminal connected to the plate conductor 7, and *g* indicates the ground terminals connected to the base plate 1. These terminals penetrate the glass envelope 11 through an airtight seal.

The input (or grid) transmission line and the output transmission line, which can be constructed by winding the conductors 4 and 6 on the rod-shaped insulating supports 3 and 5, respectively, as shown in FIGS. 3, 4 and 5, are respectively connected to the control grids g1 and anodes P of the respective pentode units at properly spaced points on said lines, and the combinations of the inductance L of each component section of the transmission lines, the grid to ground capacitance Cg, or the anode to ground capacitance $C_p$ of the pentode units $T_{u1}$ to $T_{u4}$ constitute two low-pass filter type transmission lines of super-wide band. The input and output transmission lines have respective characteristic impedances which are determined by the ratio of the above-mentioned inductance L and the capacitance $C_g$ or $C_p$; and terminating resistors matched to said characteristic impedances are connected to the end of the transmission lines at the outside of the envelope 11.

The input and output transmission lines which are disposed on the opposite surface of the base plate 1 as described above, are completely shielded from each other by the base plate 1. The area of the plates 7 and 9 and the thickness of the insulators 8 and 10 are selected so that the capacitors composed by them and the base plate 1 respectively have sufficient capacitance for bypassing high frequency signals.

Figure 2:
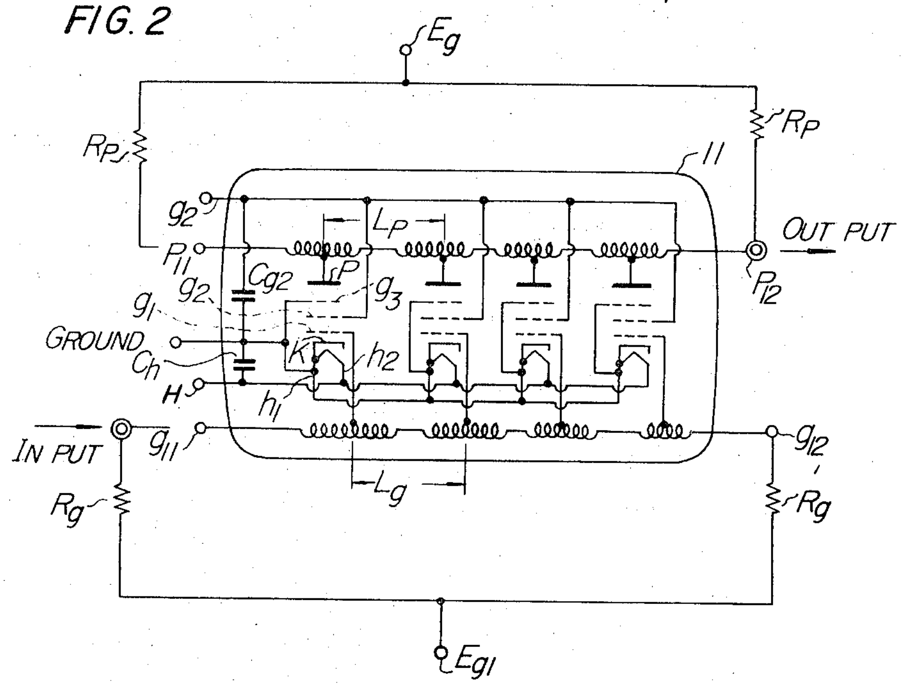
FIG. 2 is a symbolic presentation of a distributed amplifier tube embodying this invention.

FIG. 2 is an internal and external connection diagram of the distributed amplifier tube described above with reference to FIGS. 3 and 4. In FIGS. 2, 3 and 4, corresponding elements are indicated by similar reference markings.

As described above, in the distributed amplifier tube of this invention in which the respective electrodes of the pentode units are connected to the respective circuit elements disposed within minimum distances from the associated electrodes, the effect of the leads which is significant in the conventional distributed amplifiers is almost eliminated. Further, in the tube of this invention, as the elements of the pentode units as well as the circuit components are sufficiently shielded from one another by the suppressor grid electrodes and the base plate, the amplifier is free from the undesirable effects of the parastic coupling to the performance thereof.

Moreover, as the plate-shaped leads from the screen grids and the heaters to the respective terminals constitute distributed capacitors respectively with the base plate, said capacitors serving as high frequency bypasses for the screen grids and the heater respectively, the effects of high frequency signals to said grids and the heaters can be avoided without the use of discrete bypass capacitors.

Further, as the input and output transmission lines are disposed on the opposite surfaces of the base plate, the coupling between the input and output are completely prevented. The constructions of the input and output transmission lines are symmetrical in the direction of the signal propagation, that is, a bilateral construction, so that a signal is possible to be transmitted from either side, thus facilitating the easy disposition of the whole circuit.

What we claim is:

1. A plurality of pentode units enclosed within an envelope and arranged to constitute a distributed amplifier, said pentode units each having an anode, a cathode, a screen grid, a control grid and a suppressor grid, the apparatus comprising:

a conductive base plate, the suppressor grids of each of said pentode units being secured to said base plate;

a support member in each pentode unit supporting the anode, cathode, control grid and screen grid of said pentode unit in operative relationship with the suppressor grid of said pentode unit;

the suppressor grid in each pentode unit being made so as to support and supporting said support member in said pentode unit;

and input and output transmission lines respectively disposed on opposite surfaces of said base plate, input and output terminals of said each pentode unit being connected to said input and output transmission lines respectively.

2. A distributed amplifier tube as defined in claim 1, wherein a conductive plate connected to the screen grids of the pentode units is faced to the base plate with an insulating plate interposed therebetween, thereby constituting a bypass capacitor for the screen grids of all said pentode units.

3. A distributed amplifier tube as defined in claim 1, wherein a conductive plate connected to one end of the heaters of the all inner pentode units is faced to the base plate with an insulating plate interposed therebetween, thereby constituting a bypass capacitor for the heaters of all said pentode units.

* * * * *